US010700946B2

(12) United States Patent
Kojukhov et al.

(10) Patent No.: US 10,700,946 B2
(45) Date of Patent: *Jun. 30, 2020

(54) SYSTEM, METHOD, AND COMPUTER PROGRAM FOR AUTOMATICALLY CERTIFYING A VIRTUAL NETWORK FUNCTION (VNF) FOR USE IN A NETWORK FUNCTION VIRTUALIZATION (NFV) BASED COMMUNICATION NETWORK

(71) Applicant: Amdocs Development Limited, Limassol (CY)

(72) Inventors: Andrei Kojukhov, Rishon le Zion (IL); Alla Goldner, Tel Aviv (IL); Rami Avraham Schwartz, Kefar Saba (IL); Eyal Felstaine, Kfar Shmaryahu (IL); Liat Kasif Wein, Kadima (IL); Ofer Hermoni, Plano, TX (US)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 186 days.

This patent is subject to a terminal disclaimer.

(21) Appl. No.: 15/672,068

(22) Filed: Aug. 8, 2017

(65) Prior Publication Data
US 2019/0052548 A1 Feb. 14, 2019

(51) Int. Cl.
*H04L 12/24* (2006.01)
*H04L 12/26* (2006.01)

(52) U.S. Cl.
CPC ...... *H04L 41/5032* (2013.01); *H04L 41/5038* (2013.01); *H04L 43/50* (2013.01)

(58) Field of Classification Search
CPC .. H04L 41/5032; H04L 43/50; H04L 41/5038
(Continued)

(56) References Cited

U.S. PATENT DOCUMENTS 10,069,694 B1 * 9/2018 Schwartz ............ H04L 41/5096
10,387,183 B1 * 8/2019 Hermoni ............ H04L 63/1416
(Continued)

OTHER PUBLICATIONS

International Search Report and Written Opinion from PCT Application No. PCT/IB2018/055888, dated Oct. 11, 2018.
(Continued)

*Primary Examiner* — Abdullahi E Salad
(74) *Attorney, Agent, or Firm* — Zilka-Kotab, P.C.

(57) ABSTRACT

A system, method, and computer program product are provided for automatically certifying a Virtual Network Function (VNF) for use in a Network Function Virtualization based (NFV-based) communication network. In use, an online automated VNF certification system receives information associated with at least one VNF. Further, the online automated VNF certification system performs a first level of certification for the at least one VNF by validating metadata corresponding to the information associated with the at least one VNF. Additionally, the online automated VNF certification system performs a second level of certification for the at least one VNF, including testing deployment based functionality associated with the at least one VNF and validating results of testing the deployment based functionality. Still yet, the online automated VNF certification system performs a third level of certification for the at least one VNF by executing one or more test cases associated with the at least one VNF and validating results of executing the one or more test cases. Moreover, the online automated VNF certification system identifies the at least one VNF as certified as a result of performing the third level of certification for the at least one VNF.

18 Claims, 10 Drawing Sheets

(58) Field of Classification Search
USPC ........................................................ 709/224
See application file for complete search history.

(56) References Cited

U.S. PATENT DOCUMENTS

| | | | |
|---|---|---|---|
| 2015/0082308 A1* | 3/2015 | Kiess | G06F 9/5072 718/1 |
| 2015/0234725 A1* | 8/2015 | Cillis | G06F 11/263 714/33 |
| 2016/0103698 A1* | 4/2016 | Yang | G06F 11/202 714/4.11 |
| 2016/0156513 A1* | 6/2016 | Zhang | H04W 4/70 709/220 |
| 2016/0328259 A1* | 11/2016 | Xia | G06F 9/45558 |
| 2016/0337172 A1* | 11/2016 | Yu | H04L 12/6418 |
| 2016/0381150 A1* | 12/2016 | Rajagopal | G06F 9/45558 709/223 |
| 2017/0063598 A1* | 3/2017 | Zhu | H04L 41/5041 |
| 2017/0109260 A1* | 4/2017 | Wang | G06F 11/3664 |
| 2017/0141974 A1* | 5/2017 | Lahiri | H04L 43/028 |
| 2017/0171102 A1* | 6/2017 | Parker | H04L 67/02 |
| 2017/0187572 A1* | 6/2017 | Wu | H04L 29/08 |
| 2017/0222921 A1* | 8/2017 | Li | H04L 1/22 |
| 2017/0250870 A1* | 8/2017 | Zhao | H04L 43/00 |
| 2017/0257276 A1* | 9/2017 | Chou | H04L 41/0823 |
| 2017/0272523 A1* | 9/2017 | Cillis | H04L 41/082 |
| 2017/0323089 A1* | 11/2017 | Duggal | H04W 4/00 |
| 2017/0359231 A1* | 12/2017 | Chawki | H04L 41/0806 |
| 2017/0373939 A1* | 12/2017 | Liu | H04L 29/08 |
| 2018/0018192 A1* | 1/2018 | Gokurakuji | G06F 9/46 |
| 2018/0032362 A1* | 2/2018 | Buil | G06F 9/4856 |
| 2018/0121222 A1* | 5/2018 | Sharma | G06F 9/45558 |
| 2018/0121335 A1* | 5/2018 | Cillis | G06F 11/3684 |
| 2018/0131621 A1* | 5/2018 | Wu | H04L 43/028 |
| 2018/0176115 A1* | 6/2018 | Yang | H04L 41/0631 |
| 2018/0270111 A1* | 9/2018 | Oohira | G06F 9/46 |
| 2018/0278485 A1* | 9/2018 | Lugones | H04L 67/10 |
| 2018/0288101 A1* | 10/2018 | Sharma | G06F 21/602 |
| 2018/0295617 A1* | 10/2018 | Abdelmonem | H04B 1/1036 |
| 2018/0309646 A1* | 10/2018 | Mustafiz | H04L 41/5054 |
| 2018/0316559 A1* | 11/2018 | Thulasi | H04L 41/082 |
| 2018/0324261 A1* | 11/2018 | Yi | H04L 67/02 |
| 2018/0349195 A1* | 12/2018 | El Khayat | G06F 9/5027 |
| 2019/0028350 A1* | 1/2019 | Yeung | H04L 41/0893 |
| 2019/0050248 A1* | 2/2019 | Oohira | G06F 9/45558 |
| 2019/0052551 A1* | 2/2019 | Barczynski | H04L 41/12 |
| 2019/0253264 A1* | 8/2019 | Singaravelu | H04L 9/0827 |
| 2019/0260647 A1* | 8/2019 | Ishida | H04L 41/145 |
| 2019/0260690 A1* | 8/2019 | Sun | H04L 47/20 |
| 2019/0287146 A1* | 9/2019 | Maitland | G06Q 30/04 |

OTHER PUBLICATIONS

Morton, A., "TST006 clause 5.6 comments (3 actor use case)," AT&T GNS Belgium SPRL, ETSI DRAFT; NFVTST (17)000070RI, European Telecommunications Standards Institute, Apr. 17, 2017, 4 pages.

ETSI, "Network Functions Virtualisation (NFV); Management and Orchestration, VNF Packaging Specification," European Telecommunications Standards Institute, GS NFV-IFA 011, V2.1.3, Jun. 2017, 55 pages.

Brenner et al., "VNF Testing an aspect of Managing VNFs," Alcatel-Lucent, Amdocs, Verizon, NFVMAN(14)000264, Jan. 8, 2014, 3 pages.

Sawaf, A., "TST007 Section 6 Test Descriptions Summary," European Telecommunications Standards Institute, NFVTST(17)000101r2, Jun. 7, 2017, 8 pages.

ETSI, "Network Functions Virtualisation (NFV) Release 2; Protocols and Data Models; VNF Package Specification," European Telecommunications Standards Institute, GS NFV-SOL 004, V2.3.1, Jul. 2017, 17 pages.

* cited by examiner

US 10,700,946 B2

SYSTEM, METHOD, AND COMPUTER PROGRAM FOR AUTOMATICALLY CERTIFYING A VIRTUAL NETWORK FUNCTION (VNF) FOR USE IN A NETWORK FUNCTION VIRTUALIZATION (NFV) BASED COMMUNICATION NETWORK

FIELD OF THE INVENTION

The present invention relates to telecommunications and/or data communications and, more particularly to network function virtualization (NFV) of telecommunications networks.

BACKGROUND

Network Function Virtualization is a term or a name of a proposed architecture of telecom services as published by the European Telecommunications Standards Institute (ETSI) in a series of documents available from the ETSI website. NFV uses generic hardware platform and software adapted for the generic hardware platform. Thus, NFV creates a network much more flexible and dynamic than a legacy communication network. In NFV-based networks, a Virtual Network Function (VNF) decouples the software implementation of the network function from the infrastructure resources it runs on by virtualization. A network service is based on one or more VNFs and/or Physical Network Functions (PNFs), their interconnections, and chaining definitions. The VNFs can be executed on almost any generic hardware processing facility. Therefore, VNFs may be installed, removed, and moved between hardware facilities, much more easily, less costly and thus, more frequently.

The flexibility of the NFV-based network enhances the means available for optimizing the network's capacity and performance. However, current techniques for verifying and certifying VNFs that are to be used in NFV-based networks are limited. Service development is generally constrained by the speed of a Network Engineering create, test, and debug cycle. This is typically a very manual, document-based, and time consuming process.

There is thus a need for addressing these and/or other issues associated with the prior art.

SUMMARY

A system, method, and computer program product are provided for automatically certifying a Virtual Network Function (VNF) for use in a Network Function Virtualization based (NFV-based) communication network. In use, an online automated VNF certification system receives information associated with at least one VNF. Further, the online automated VNF certification system performs a first level of certification for the at least one VNF by validating metadata corresponding to the information associated with the at least one VNF. Additionally, the online automated VNF certification system performs a second level of certification for the at least one VNF, including testing deployment based functionality associated with the at least one VNF and validating results of testing the deployment based functionality. Still yet, the online automated VNF certification system performs a third level of certification for the at least one VNF by executing one or more test cases associated with the at least one VNF and validating results of executing the one or more test cases. Moreover, the online automated VNF certification system identifies the at least one VNF as certified as a result of performing the third level of certification for the at least one VNF.

DETAILED DESCRIPTION

Figure 1A:
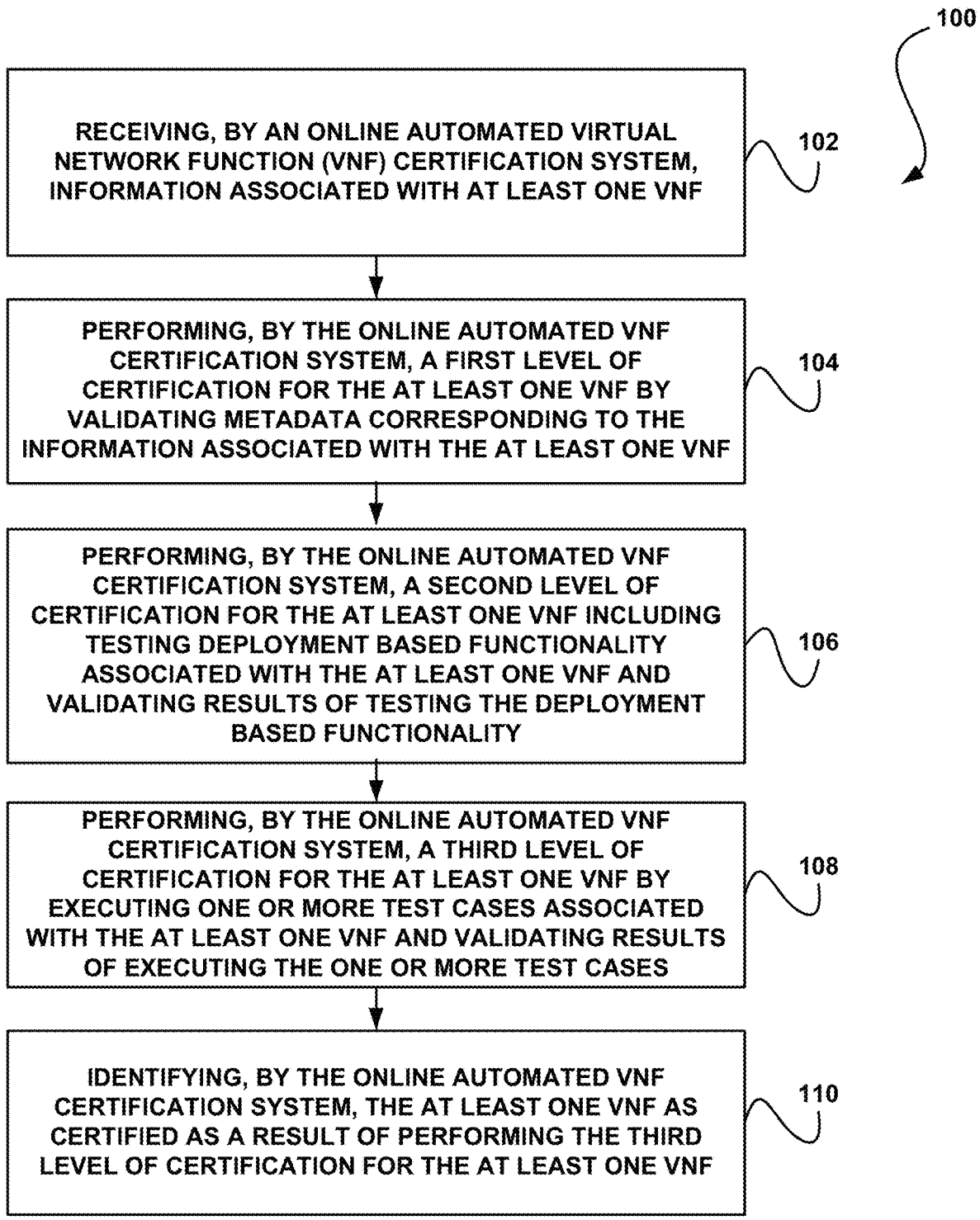
FIG. 1A illustrates a method for automatically certifying a Virtual Network Function (VNF) for use in a Network Function Virtualization based (NFV-based) communication network, in accordance with one embodiment.

FIG. 1A illustrates a method 100 for automatically certifying a Virtual Network Function (VNF) for use in a Network Function Virtualization based (NFV-based) communication network, in accordance with one embodiment.

In use, an online automated VNF certification system receives information associated with at least one VNF. See operation 102. The information may be received from a vendor of the VNF. For example, the information associated with the VNF may include responses to a questionnaire provided to a vendor.

The information may include any information associated with the VNF. For example, the information associated with the VNF may include a VNF image associated with the VNF. As another example, the information associated with the VNF may include one or more deployment scripts associated with the VNF. Of course, the information may include any information in the VNF package (e.g. as mandated by the European Telecommunications Standards Institute, etc.). For example, the information would likely include a VNF descriptor, as mandated by ETSI. The information may be associated with one or more VNFs (e.g. a chain of VNFs, etc.).

In one embodiment, the information associated with the VNF may be received via at least one user interface associated with the online automated VNF certification system. In the context of the present description, an online automated VNF certification system refers to any system capable of performing certification, verification, and/or testing associated with VNFs. In various embodiments, the online automated VNF certification system may include one or more processors, memory, servers, databases, and various computer programs/logic, etc.

In one embodiment, the online automated VNF certification system may be accessed over one or more networks by vendors, customers, VNF designers and/or VNF testers, etc. In one embodiment, the online automated VNF certification system may include and/or be associated with a service design and creation (SD&C) onboarding user interface.

As shown further in FIG. 1, the online automated VNF certification system performs a first level of certification for the at least one VNF by validating metadata corresponding to the information associated with the at least one VNF. See operation 104. In this case, performing the first level of certification for the VNF may include validating a format and structure associated with the VNF image, which was provided with the information.

For example, the online automated VNF certification system may expect the format and/or structure of the information to arrive according to an established standard (e.g. in a VNF package as mandated by the European Telecommunications Standards Institute, etc.). Thus, at least a portion of the first level of certification may include verifying that the information received conforms to these requirements. As another example, performing the first level of certification for the VNF may include validating VNF descriptor integrity associated with the VNF image.

If the first level of certification fails, various remedies may be available. For example, in one embodiment, the online automated VNF certification system may send a query to the supplier of the VNF information (e.g. the vendor, etc.) for additional information and/or information in the correct format. As another example, the online automated VNF certification system may automatically reconfigure the VNF information to conform to a standard format/structure. As another example, the online automated VNF certification system may alert a user (e.g. a VNF designer, etc.) that the first level of certification has failed (e.g. utilizing a user interface, an alert, etc.).

If the first level of certification passes, the VNF may be identified as passing the first level of certification (e.g. in a database associated with the online automated VNF certification system, etc.). In one embodiment, the VNF may be required to pass the first layer of certification before proceeding with the certification process.

With further reference to FIG. 1, the online automated VNF certification system performs a second level of certification for the at least one VNF, including testing deployment based functionality associated with the at least one VNF and validating results of testing the deployment based functionality. See operation 106. Testing the deployment based functionality may include testing a variety of artifacts associated with the deployment of the VNF. For example, the second level of certification for the VNF may include testing artifact production associated with the VNF. As another example, the second level of certification for the VNF may include testing software image distribution associated with the at least one VNF. As yet another example, the second level of certification for the VNF may include testing a policy configuration associated with the VNF.

In one embodiment, the VNF may be configured and or modelled prior to performing the second layer of certification. In this case, the online automated VNF certification system may automatically perform the configuration or receive the VNF that was configured/modeled based on the information associated with the VNF after performing the first level of certification for the VNF. As one option, a service design and creation onboarding user interface associated with the online automated VNF certification system may be utilized to model the VNF prior to performing the second level of certification. Additionally, the service design and creation onboarding user interface may be utilized to instantiate the VNF prior to performing the second level of certification.

If the second level of certification fails, various remedies may be available. For example, in one embodiment, the online automated VNF certification system may report the failure to a VNF developer and/or tester. As another example, the online automated VNF certification system may automatically attempt to remedy the failure.

If the second level of certification passes, the VNF may be identified as passing the second level of certification (e.g. in a database associated with the online automated VNF certification system, etc.). In one embodiment, the VNF may be required to pass the second layer of certification before proceeding with the certification process.

Still yet, the online automated VNF certification system performs a third level of certification for the at least one VNF by executing one or more test cases associated with the at least one VNF and validating results of executing the one or more test cases. See operation 108. The test cases may be provided by a vendor and/or be provided by a VNF designer and/or VNF tester.

The test cases may be configured for testing any type of functionality associated with the VNF. For example, the third level of certification for the VNF may include a configuration verification for the VNF. As another example, the third level of certification for the VNF may include life cycle management and monitoring associated with the VNF. Additionally, the third level of certification for the VNF may include a functional certification for the VNF. As another example, the third level of certification for the VNF may include a basic performance indication for the VNF.

If the third level of certification fails, various remedies may be available. For example, in one embodiment, the online automated VNF certification system may report the failure to a VNF developer and/or tester. As another example, the online automated VNF certification system may automatically attempt to remedy the failure.

If the third level of certification passes, the VNF may be identified as passing the third level of certification (e.g. in a database associated with the online automated VNF certification system, etc.). Further, the online automated VNF certification system may identify (e.g. mark, label, document, etc.) the at least one VNF as certified as a result of performing the third level of certification for the at least one VNF. See operation 110. In this case, identifying the VNF as certified may indicate that the VNF is authorized to be utilized in an NFV-based network. Additionally, identifying the VNF as certified may be utilized to recommend the VNF to customers, etc.

Still yet, in one embodiment, the online automated VNF certification system may perform a fourth level of certification for the VNF, including testing at least one environment specific attribute associated with the VNF. The environment specific attribute may be associated with a specific VNF customer and/or NFV environment, etc. In this case, the online automated VNF certification system may identify the VNF as certified as a result of performing the fourth level of certification for the VNF.

It should be noted that, although the method 100 is described in terms of layers of certification, in various embodiments, aspects of the various certifications may be combined into one or more layers.

In one embodiment, in order to provide the pre-procurement of a candidate VNF product for a service provider, as part of the certification process, the VNF certification system may rely on a list of non-functional key performance indicators (KPIs) that validate the ability of at least one VNF to be deployed on an NFV Infrastructure (NFV-I) and orchestrated by the NFV Orchestrator (NFV-O) and VNF-Manager (VNF-M) as specified in the ETSI NFV standardization.

In this case, the KPIs may be based on agreed non-functional capabilities validating predefined "Cloud-native" parameters. As an example, the KPIs used for verification may be associated with micro-service design, where the VNF components (VNF-Cs) are standard and reusable (e.g. such as a Load Balancer VNF-C, etc.). As another example, the KPIs used for verification may be associated with VNF design, allowing VNF flexible use within a service provider network service including events and KPIs to provide multiple options for SP deployment flavors. As another example, the KPIs used for verification may be independent of a specific NFV-I type and may be deployed on multiple NFV-Is (e.g. Open Stack, VMware, Azure, etc.).

As another example, the KPIs used for verification may be associated with resiliency, where the VNF includes a built-in high-availability mechanism such as multiple functions arranged in a highly-available cluster. As yet another example, the KPIs used for verification may be associated with granular scalability. Additionally, the KPIs used for verification may be associated with clear and flexible license models. As another example, the KPIs used for verification may be associated with security features. Still yet, the KPIs used for verification may be associated with leveraging acceleration ability (e.g. as much as possible, etc.).

Of course, the KPIs may be associated with any combination of these parameters. In other words, the verification system may utilize any of these non-functional KPIs or associated information to verify one or more VNFs.

In one embodiment, this certification may be part of the third level of certification for the VNF. Of course, this certification may be viewed/implemented as a separate certification/validation process.

Figure 1B:
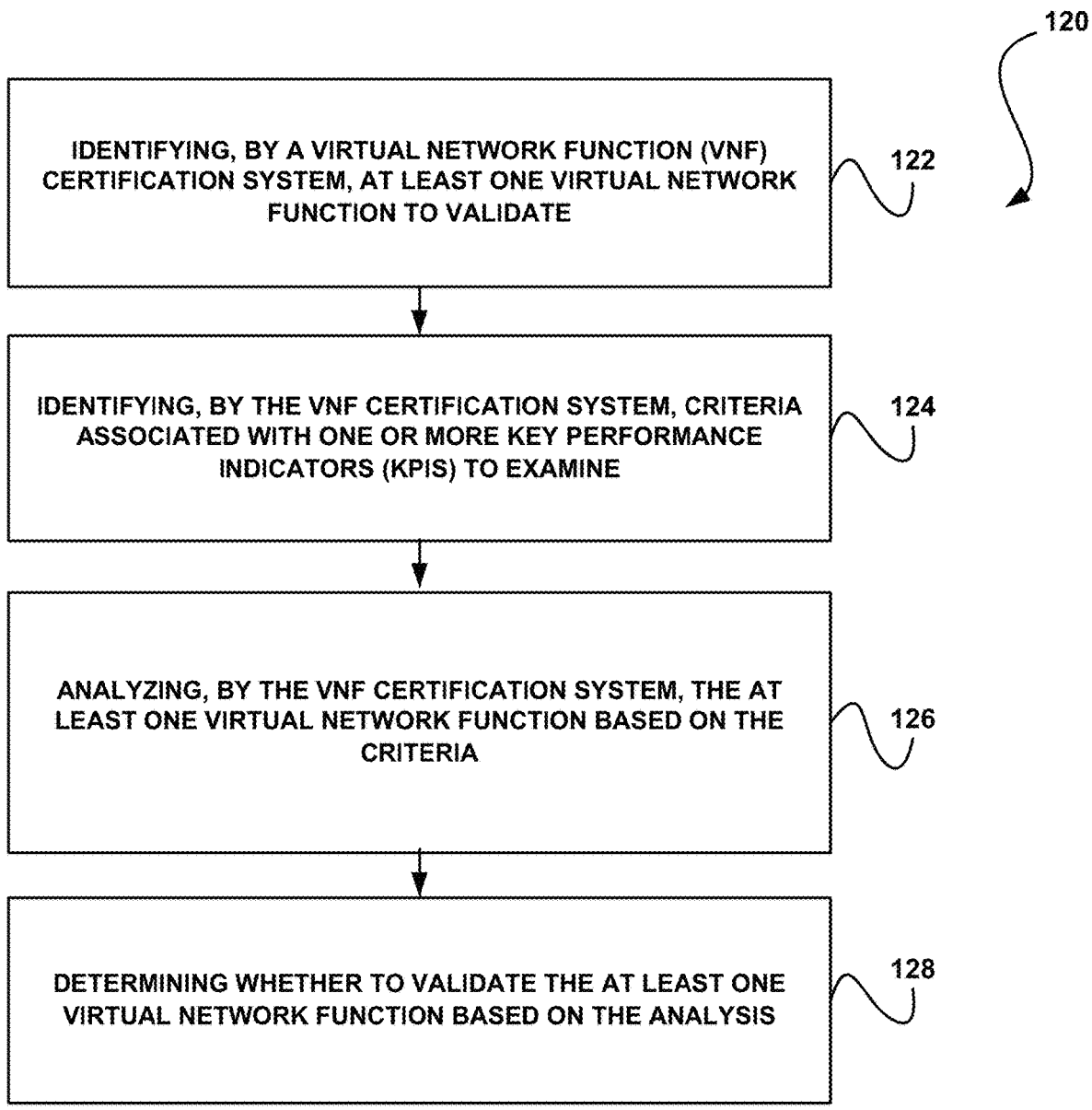
FIG. 1B illustrates a method for automatically validating a VNF for use in an NFV-based communication network, in accordance with one embodiment.

FIG. 1B illustrates a method 120 for automatically validating a VNF for use in an NFV-based communication network, in accordance with one embodiment.

In operation, the VNF certification system may identify at least one VNF to be validated (e.g. one VNF, a chain of VNFs, etc.). See operation 122.

The VNF certification system then identifies criteria associated with one or more KPIs to examine. See operation 124. The VNF certification system analyzes the VNF based on the criteria and determines whether to validate the VNF based on the analysis. See operations 126 and 128. The criteria associated with the KPIs may include any parameter and/or measurement associated with a KPI.

If the validation of method 120 fails, various remedies may be available. For example, in one embodiment, the online automated VNF certification system may report the failure to a VNF developer and/or tester. As another example, the online automated VNF certification system may automatically attempt to remedy the failure.

If the validation of method 120 passes, the VNF may be identified as passing the validation (e.g. in a database associated with the online automated VNF certification system, etc.). Further, the online automated VNF certification system may identify (e.g. mark, label, document, etc.) the VNF as certified as a result of performing this certification for the VNF. In this case, identifying the VNF as certified may indicate that the VNF is authorized to be utilized in an NFV-based network. Additionally, identifying the VNF as certified may be utilized to recommend the VNF to customers, etc.

In the context of the present description, the terms "network" and "communication network" refer to the hardware and software connecting one or more communication elements including wireline networks, wireless networks, and/or combinations thereof.

The terms "network function virtualization" (NFV) and virtual network function (VNF) are described in a series of documents published by the European Telecommunications Standards Institute (ETSI) and available from the ETSI website. The term "virtual network function or feature" (VNF) refers to a particular implementation of a function, a feature, or a service provided by the network, internally within the network, or externally to a customer, subscriber, end-user, a terminal or a server. A VNF may include the software program implementation of the function or feature or service. The term VNF instance (VNF-I) refers to a particular process or task executing the VNF program by a particular virtual machine or processor or computing facility and/or used by a particular customer (or subscriber, end-user, terminal or server, etc.).

The term "service" refers to any type of use (such as a use case) that a NFV-based communication network may offer or provide to one or more communication elements. A service may include switching data or content between any number of elements, providing content from a server to a communication element or between servers, securing and protecting communication and content, processing content provided by the customer or by a third party, providing backup and redundancy, etc. A service may be using partial functionality of a VNF or may include one or more VNFs and/or one or more VNF instances forming a service sub-network (or interconnection model). In the context of the present description, the term "chain" may refer to such service sub-network, such as a particular plurality of VNFs and/or VNF instances associated with a particular service type or a service instance.

The term "deployment", when referring to hardware elements, including processing elements, memory elements, storage elements, connectivity (communication) elements, etc., refer to the configuration or topology of these hardware elements creating the NFV-based network. The term "deployment", when referring to software elements, such a VNFs and VNF instances, refers to the association between such software elements and hardware elements.

The term "deployment optimizations" refers to association of software and hardware elements in a manner that satisfies a particular set of requirements and/or rules, such as load-related and performance-related requirements, or a manner that makes a better use of a particular hardware deployment, such as by reducing operational cost.

The terms "service deployment optimization", or "service optimization" or "chain optimization" refer to optimizing the deployment of a service chain, i.e., optimizing the deployment of one or more VNF instances making a particular service. The terms chain optimization and service optimization may thus be used interchangeably.

The term "session" refers to a communication connection between two or more entities that persists for a period of time during which data may be exchanged there between. A session may be implemented and managed by a session layer in the corresponding network protocol. The term session may include a network session and a logical session. The network session may be associated with the devices used to communicate, while the logical session may be associated with the communicating parties (users) and may persist regardless of the communication means that the parties are using.

The term "service continuity" includes and applies to the terms "session continuity" and "streaming continuity". Streaming refers to streaming media, session or service, such as sound (including voice), video, multimedia, animation, etc. The term service usually applies to a group of VNFs (or the functionality provided by the group of VNFs) but may also apply to a single VNF (or the functionality provided by the VNF). The term "continuity" indicates that the session or the service is not interrupted, or that an interruption is short enough that a user is not aware of such interruption, or that the interruption does not cause any loss of data, or that the loss is handled in acceptable manner (e.g. a few packets of speech lost, but the conversation can continue, etc.).

The term "availability" or "service availability" refers to a level of the service, or a characteristic of the service, in which the service provider should provide the service, albeit possible hardware or software faults. For example, the service provider may obligate to the customer to provide a particular level of processing power, communication features such as bandwidth, latency, and jitter, database consistency, etc. Such level or characteristic of the service should be available to the customer even when a hardware component or a software component providing the service do not function properly. Providing availability may therefore require additional resources such as backup resources and/or mirroring. Hence "availability" may also refer to the terms "fault recovery" and "redundancy".

The term "fault recovery" refers to the process of recovering one or more of the network's services, functions, and features after a fault, whether caused by a hardware malfunction, a system crash, a software bug or a security breech or fault. A hardware malfunction includes, but is not limited to, any type of inadequate performance associated with, for example, power supply, processing units, memory, storage, transmission line, etc. The term "fault recovery" also applies to recovering the functionality of one or more VNFs or VNF instances with respect to any of the above. The terms security breech or security fault may be used interchangeably.

The term "redundancy" refers to any type of component of the network that is fully or partly duplicated, provided in standby mode, or otherwise available, to replace another component of the network when that other component stops functioning properly or otherwise indicates some kind of fault. Redundancy may apply, but is not limited to, hardware, software, data and/or content.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

The principles and operation of a system, method, and computer program product for automatically certifying a VNF for use in an NFV-based communication network according to various embodiments may be further understood with reference to the following drawings and accompanying description. For example, FIG. 2, etc. illustrates how and where a certified VNF may be deployed in an NFV-based communication network.

Figure 2:
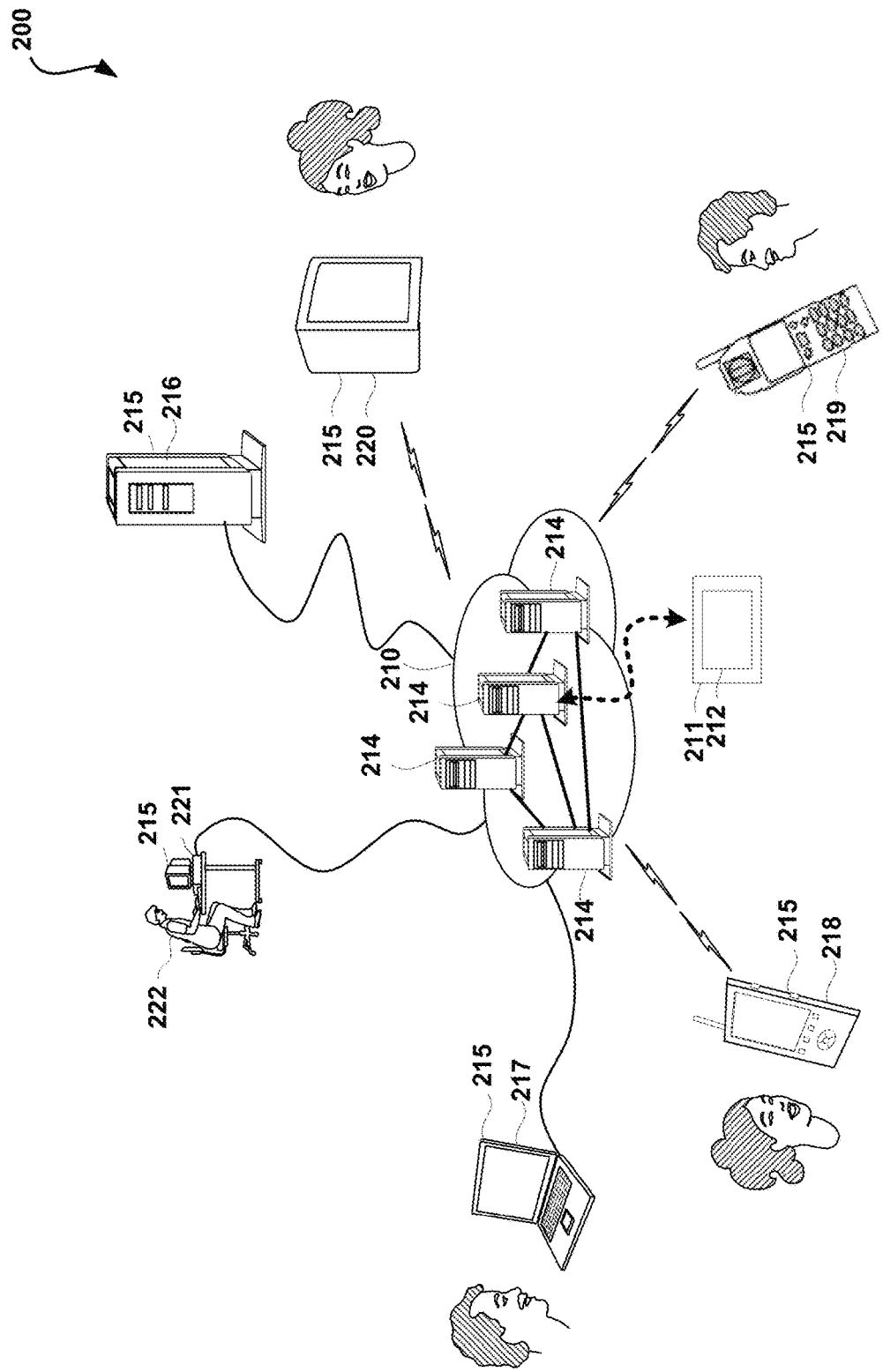
FIG. 2 illustrates a simplified diagram of a system associated with an NFV-based communication network, in accordance with one embodiment.

FIG. 2 illustrates a simplified diagram of a system 200 associated with an NFV-based communication network 210, in accordance with one embodiment. As an option, the system 200 may be implemented in the context of the details of FIG. 1. Of course, however, system 200 may be implemented in the context of any desired environment. Further, the aforementioned definitions may equally apply to the description below.

As shown in FIG. 2, at least one NFV-based network 210 is provided. The NFV-based communication network 210 includes an NFV management system 2111, and an NFV-orchestration (NFV-O) module 212, according to one embodiment.

In the context of the present network architecture, the NFV-based network 210 may take any form including, but not limited to a telecommunications network, a local area network (LAN), a wireless network, a wide area network (WAN) such as the Internet, peer-to-peer network, cable network, etc. While only one network is shown, it should be understood that two or more similar or different NFV-based networks 210 may be provided.

The NFV-based network 210 may include one or more computation facilities 214, each including one or more hardware units and being interconnected by communication links to form the NFV-based network 210. At least one of the computation facilities 214 may include the NFV management system 211. The NFV management system 211 may include the NFV-O module 212.

The NFV-O module 212 may be executed by one or more processors, or servers, such as computation facilities 214, of the NFV-based network 210. The NFV-O module 212 may be executed as an NFV-O instance or component. The NFV-O module 212 may therefore include a plurality of NFV-O instances or components as will be further explained below.

In one embodiment, the NFV-based network 210 may even have a plurality of any of the NFV management systems 211 and/or the NFV-O modules 212.

A plurality of devices 215 are communicatively coupled to the NFV-based network 210. For example, a server computer 216 and a computer or terminal 217 may be coupled to the NFV-based network 210 for communication purposes. Such end-user computer or terminal 217 may include a desktop computer, a lap-top computer, a tablet computer, and/or any other type of logic or data processing device. Still yet, various other devices may be coupled to the NFV-based network 210 including a personal digital assistant (PDA) device 218, a mobile phone device 219, a television 220 (e.g. cable, aerial, mobile, or satellite television, etc.)2, etc. These devices 215 may be owned and/or operated by end-users, subscribers and/or customers of the NFV-based network 210. Others of the devices 215, such as administration station 221, may be owned and/or operated by the operator of the NFV-based network 210.

A network administrator 222 may supervise at least some aspects of the operation of the NFV-based network 210 by controlling an NFV infrastructure including the NFV management system 211 and the NFV-O 212.

Figure 3:
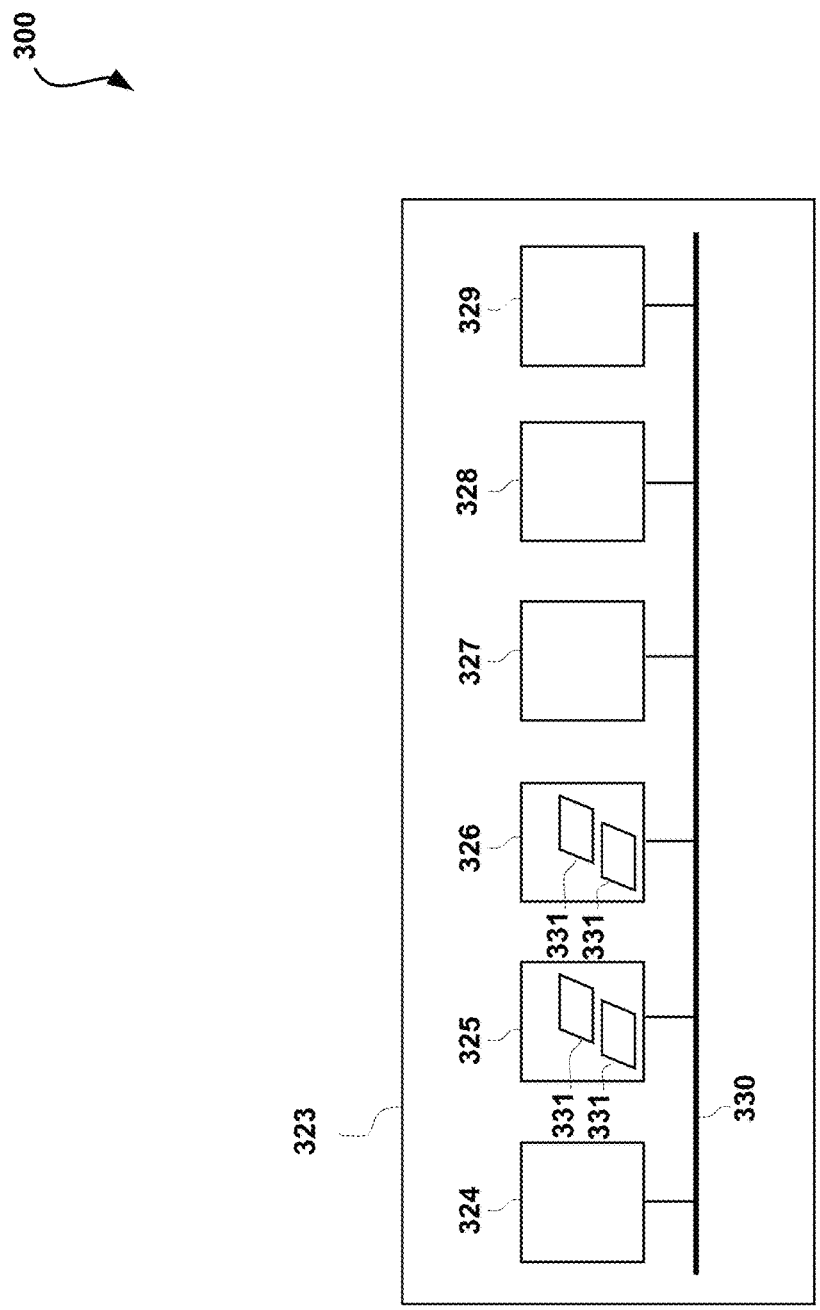
FIG. 3 illustrates a simplified block diagram of a hardware unit of an NFV-based network, in accordance with one embodiment.

FIG. 3 illustrates a simplified block diagram 300 of a hardware unit 323 of an NFV-based network, in accordance with one embodiment. As an option, the block diagram 300 may be viewed in the context of the details of the previous Figures. Of course, however, block diagram 300 may be viewed in the context of any desired environment. Further, the aforementioned definitions may equally apply to the description below.

In one embodiment, the hardware unit 323 may represent a computing facility 214 of FIG. 2, or a part of a computing facility 214. The hardware unit 323 may include a computing machine. The term computing machine relates to any type or combination of computing devices, or computing-related units, including, but not limited to, a processing device, a memory device, a storage device, and/or a communication device.

The hardware unit 323 may therefore be a network server, and the computing facility 214 may be a plurality of network servers, or a data-center, including cloud-based infrastructure. As an option, the hardware unit 323 may be implemented in the context of any of the devices of the NFV-based network 210 of FIG. 2 and/or FIG. 5 and in any desired communication environment.

Each hardware unit 323 (or computing machine, computing device, computing-related unit, and/or hardware component, etc.), including each communication link between such hardware units, may be associated with one or more performance type and a respective performance rating or value, where the hardware unit and/or communication link is operative to provide the performance value. Performance types are, for example, processing power, cash memory capacity, regular memory capacity (e.g. RAM, dynamic, or volatile memory, etc.), non-volatile memory (e.g. such as flash memory, etc.) capacity, storage capacity, power, cooling, bandwidth, bitrate, latency, jitter, bit error rate, and packet loss, etc. Virtual machines may run on top of the hardware unit 323 and a VNF may be run on one or more of such virtual machines.

The hardware unit 323 may be operative to provide computing infrastructure and resources for any type and/or instance of software component executed within the NFV-based network 210 of FIG. 2. In this regard, the hardware unit 323 may be operative to process any of the processes described herein, including but not limited to, any NFV-related software component and/or process. The hardware unit 323 is operative to process virtual network functions (VNFs), VNF instances, network function virtualization orchestration (NFV-O) software, modules and functions, data center management software, and/or cloud management systems (CMS), etc.

In various embodiments, the hardware unit 323 may include at least one processor unit 324, one or more memory units 325 (e.g. random access memory (RAM), a non-volatile memory such as a Flash memory, etc.), one or more storage units 326 (e.g. including a hard disk drive and/or a removable storage drive, representing a floppy disk drive, a magnetic tape drive, a compact disk drive, etc.), one or more communication units 327, one or more graphic processors 328 and displays 329, and one or more communication buses 330 connecting the various units/devices.

The hardware unit 323 may also include one or more computer programs 331, or computer control logic algorithms, which may be stored in any of the memory units 325 and/or storage units 326. Such computer programs, when executed, enable the hardware unit 323 to perform various functions (e.g. as set forth in the context of FIG. 1, etc.). The memory units 325 and/or the storage units 326 and/or any other storage are possible examples of tangible computer-readable media.

It is appreciated that computer program 331 may include any of the NFV management system 211 and/or the NFV-O 212 of FIG. 2.

Figure 4:
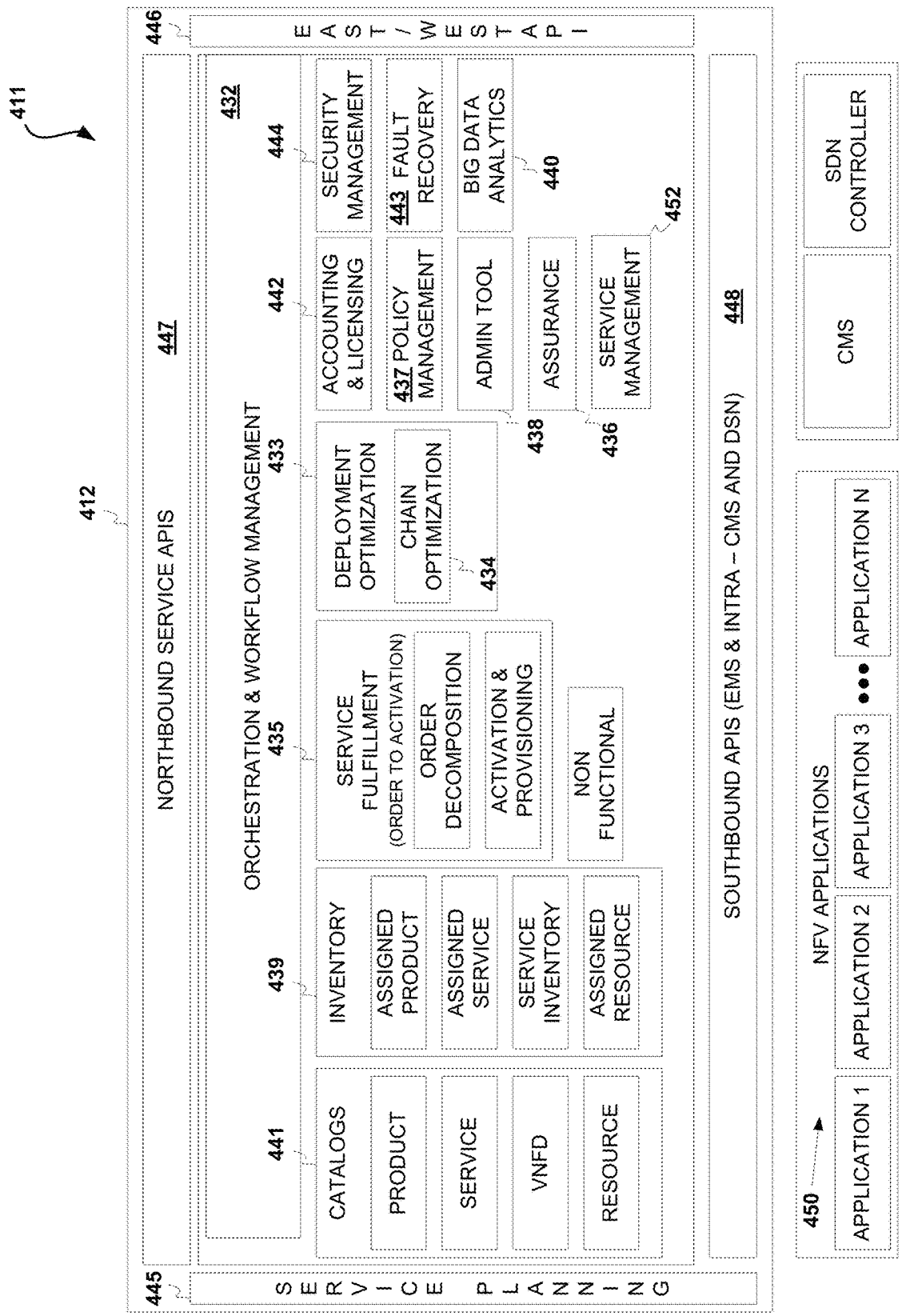
FIG. 4 illustrates a simplified diagram of an NFV management system, in accordance with one embodiment.

FIG. 4 illustrates a simplified diagram of an NFV management system 411, in accordance with one embodiment. As an option, the NFV management system 411 may be implemented in the context of the details of the previous Figures. For example, in one embodiment, the NFV management system 411 may represent the NFV management system 211 of FIG. 2. Of course, however, the NFV management system 411 may be implemented in the context of any desired environment. Further, the aforementioned definitions may equally apply to the description below.

In one embodiment, the NFV management system 411 may include an NFV-O module 412. The NFV management system 411 may include one or more NFV-O modules 412. In various embodiments, each of the NFV-O modules 412 may include orchestration and workflow management 432 that is responsible for managing (i.e. orchestrating) and executing all NFV-O processes, including inbound and/or outbound communication and interfaces.

The NFV management system 411 may include a deployment optimization module 433 that enables a user to devise automatic mechanisms for network optimizations. The deployment optimization module 433 may operate these mechanisms automatically and continuously to optimize the distribution of VNFs 450 and their VNF instances in real-time (or near-real-time) by migrating VNFs 450 and VNF instances (e.g. VNF instances 551 of FIG. 5, etc.) between hardware units (e.g. hardware units 551 of FIG. 5, etc.).

The NFV management system 411 may also include a chain optimization module 434. The chain optimization module 434 may be a part of deployment optimization module 433 and may enable a user to devise automatic mechanisms for optimizing the deployment of chains or groups of VNFs 450 and VNF instances. A service provided by an NFV-based network is typically made of a particular chain or group of particular VNFs 450 and their respective VNF instances. The chain optimization module 434 optimizes the deployment of chains or groups of services between hardware units according to the requirements and specifications associated with and/or adapted to the particular service, or chain, or a group.

The chain optimization module 434 may operate these mechanisms automatically and continuously to optimize in real-time the operation of chains or groups of the VNFs 450 and their VNF instances by re-planning their distribution among hardware units and optionally also by migrating the VNFs 450 and associated VNF instances between hardware units.

The NFV management system 411 may also include a service fulfillment module 435 that manages service and resource (e.g. VNF) instance lifecycle activities as part of the process and orchestration activities. This may include on boarding, initiation (e.g. instantiation), installation and configuration, scaling, termination, software update (e.g. of a running VNF, etc.), test environment, and/or rollback procedure. Additionally, the service fulfillment module 435 may also provide decomposition of an order to multiple network services, and the activation of such network service as a single VNF instance, or as a chain of VNF instances.

Order decomposition includes translating business orders into a network oriented service implementation plan. For example, a business order may be decomposed into a plurality of functions, some of which may be provided by different software programs or modules (e.g. such as various VNFs) instantiated as a plurality of VNF instances across one or more data centers. Performing order decomposition, the service fulfillment module 435 may consult the deployment optimization module 433 for the best deployment option to customer order in a given network and resource condition. Performing order decomposition, the service fulfillment module 435 may then initiate the service including all its components. Order decomposition may be performed in several locations across an NFV-O hierarchy. For example, initial decomposition may be performed in the root of the NFV-O, and then further decomposition may be performed in the relevant data centers.

In one embodiment, an activation and provisioning module may provide the plan for activation and provisioning of the service to the orchestration and workflow management 432. The activation and provisioning module may also provide feedback on fulfillment status to an upper layer. This upper layer may include the business support services (BSS).

The NFV management system 411 may also include an assurance module 436 and a service management module 452 capable of gathering real time data on network elements' status and creating a consolidated view of services and network health. The assurance module 436 includes assurance functionality and may interact with the service management module 452 to perform assurance related lifecycle management procedures. Lifecycle management can be also triggered by other modules, policies, manual intervention, or from the VNFs themselves, etc. The assurance module 436 and the service management module 452 may also trigger events associated with lifecycle management and faults. The assurance module 436 and the service management module 452 may monitor the health of the network and may execute fault recovery activities.

The assurance module 436 and the service management module 452 provide the ability to monitor services' status and performance according to the required criteria. The assurance module 436 and the service management module 452 may also interact with the network infrastructure (e.g. including computing, storage, and networking, etc.) to receive the required information, analyze the information, and act upon each incident according to the defined policy. The assurance module 436 and the service management module 452 are able to interact with analytics to enrich a policy assurance module. Interfaces may also be provided for implementation by an external system.

The NFV management system 411 may also include a policy management module 437 that enables a user to define and configure offline and/or real-time policy for controlling VNF and service related rules. The policy management module 437 may contain the preconfigured policies and activities as well as selection rules for the NFV-O process to determine the preferred policy or activity to be performed for a particular process event. The policy management may be multi-layered, including vendor policy, service policy, and operator policy, etc. The policy mechanism may trigger the suitable policy layer (vendor/service/operator).

The NFV management system 411 may also include an administration module 438 that provides an overall view of the network, manual lifecycle management and intervention, and manual system administration and configuration. The administration module 438 may be operable to enable a user such as an administrator (e.g. administrator 222 of FIG. 2, etc.) to manage, view, and operate the NFV-O system. The administration module 438 may also provide a view of the network topology and services, the ability to perform specific activities such as manual lifecycle management, and changing service and connectivity configuration.

The NFV management system 411 may also include an inventory management module 439 that maintains a distributed view of deployed services and hardware resources. Inventory catalogues may reflect the current instantiation and allocation of the resources and services within the network mapped into products and/or customer entities.

The NFV management system 411 may also include a big data analytics module 440 that analyzes network and service data to support network decisions involving services and subscribers to improve network performance based on actual usage patterns. The big data analytics module 440 may also generate what-if scenarios to support business-oriented planning processes. Additionally, the big data analytics module 440 may function to analyze and evaluate the information for various planning aspects (e.g. Virtual Network Capacity Planning, Data Center Capacity Planning, Value based planning, Cost analysis for network deployment alternatives, etc.), deployment and management (e.g. Guided Operator Recommendations, What-if scenario analysis and simulation, application rapid elasticity and resource usage optimization, etc.), and may support business-oriented planning processes.

The NFV management system 411 may also include a catalog module 441 may include records defining various aspects of the network, such as products, services, and resources such as hardware units and VNFs (e.g. a VNF directory, etc.). The catalog module 441 may include a collection of centralized, hierarchical information repositories containing resource, service and product definitions with their relationship, versioning, and/or descriptors, etc. Such records may include templates enabling a user, such as an administrator, to define particular network components such as resources, products, services, etc. A resource template may define resources descriptors, attributes, activities, procedures, and/or connectivity, etc. A service template may define a service variation from resource building blocks. A product template may define parameters of a sellable product (e.g. prices, rating, etc.) based on service composition (e.g. in one embodiment, this may be part of a BSS catalogue).

The inventory management module 439, the big data analytics module 440, and/or the catalog module 441 may support multiple data centers, multiple CMSs and provide a centralized view across the infrastructure. The inventory management module 439, the big data analytics module 440, and/or the catalog module 441 may also support hybrid networks and services maintaining both physical and virtual resources.

The NFV management system 411 may also include an accounting and licensing module 442 that may be operable to record and manage network software usage data for commercial purposes including licensing, accounting, billing, and reconciliation of services with subscribers and providers. The accounting and licensing module 442 may manage licensing and usage of virtual network applications, including the ability to support complex rating schemes, based on various parameters such as CPU, memory, data, etc. The accounting and licensing module 442 may enable users to define the pricing of particular VNF modules and provide settlement with vendors. The accounting and licensing module 442 may also enable the evaluation of internal costs of services provided within the network for calculating return on investment (ROI).

The NFV management system 411 may also include a fault recovery module 443 (otherwise named disaster recovery planning module or DRP, etc.) that enables a user to plan and manage disaster recovery procedures for the NFV-O and/or the entire network.

The NFV management system 411 may also include a security management module 444 that provides the authentication authorization and accounting services of application security across the network. The security management module 444 may include, for example, an authentication module and function. In one embodiment, the authentication module and function (e.g. including identity management, etc.) may authenticate the identity of each user defined in the system. Each user may have a unique user identity and password. The system may support password based authentication with flexible password policy. Integration with external authentication providers may be done via additional system enhancements. The authorization module and function may support a role-based access control (RBAC) mechanism, where each user is assigned with one or more roles according to the business needs based on the least privileges concept (e.g. standard or administrator roles). In one embodiment, the accounting and licensing module 442 may provide an audit of security events such as authentication or login events.

As an option, the security management module 444 may use rules to protect sensitive information. For example, such rules may be used to ensure the data accessed is used for the specific purposes for which it was collected, sensitive information is encrypted when in storage/transit and masked/truncated on display and logs, and that the entire security system is deployed in the customer's intranet network (i.e. behind network/infrastructure measures), in an independent domain, etc.

In one embodiment, the NFV management system 411 may further include a Secure Development Life Cycle (SDLC) module that ensures that security aspects are handled during a project's life cycle, such as security design, security testing, etc.

As shown further in FIG. 4, the NFV management system 411 may include a service planning module 445. The service planning module 445 may be used by a communication service provider (CSP) sales representative, enterprise, and/or technician, as part of selling engagement process with enterprise/SMB customers.

The service planning module 445 may also provide the ability to interact with catalogues, customer data, network and ordering systems to provide online network service proposals for the enterprise customers with ability to quote update the proposal, validate the serviceability and network inventory, and once done, provide the service order for activation using the northbound interface.

The NFV management system 411 may also include east/west APIs 446 that include various domains/activities interfaces, including an information source to a big data repository, and interaction capability with a physical network system (OSS).

Northbound APIs 447 provides application programming interfaces (APIs) to various external software packages, such as business support system (BSS) for service order fulfillment, cancel and update activities, status notification, resource inventory view, monitoring system, assurance system, service planning tool, administration tool for system view and configuration, and big data repository, etc.

Further, the southbound APIs 448 may provide APIs for external software packages, such as CMS (including service and VNFs lifecycle activities—receiving from the infrastructure status and monitoring information for upstream system and activities [e.g. assurance]), an SDN Controller (or other connectivity system) to configure inter and intra data center connectivity, an EMS to configure the VNF, and a VNF for a direct configuration.

Figure 5:
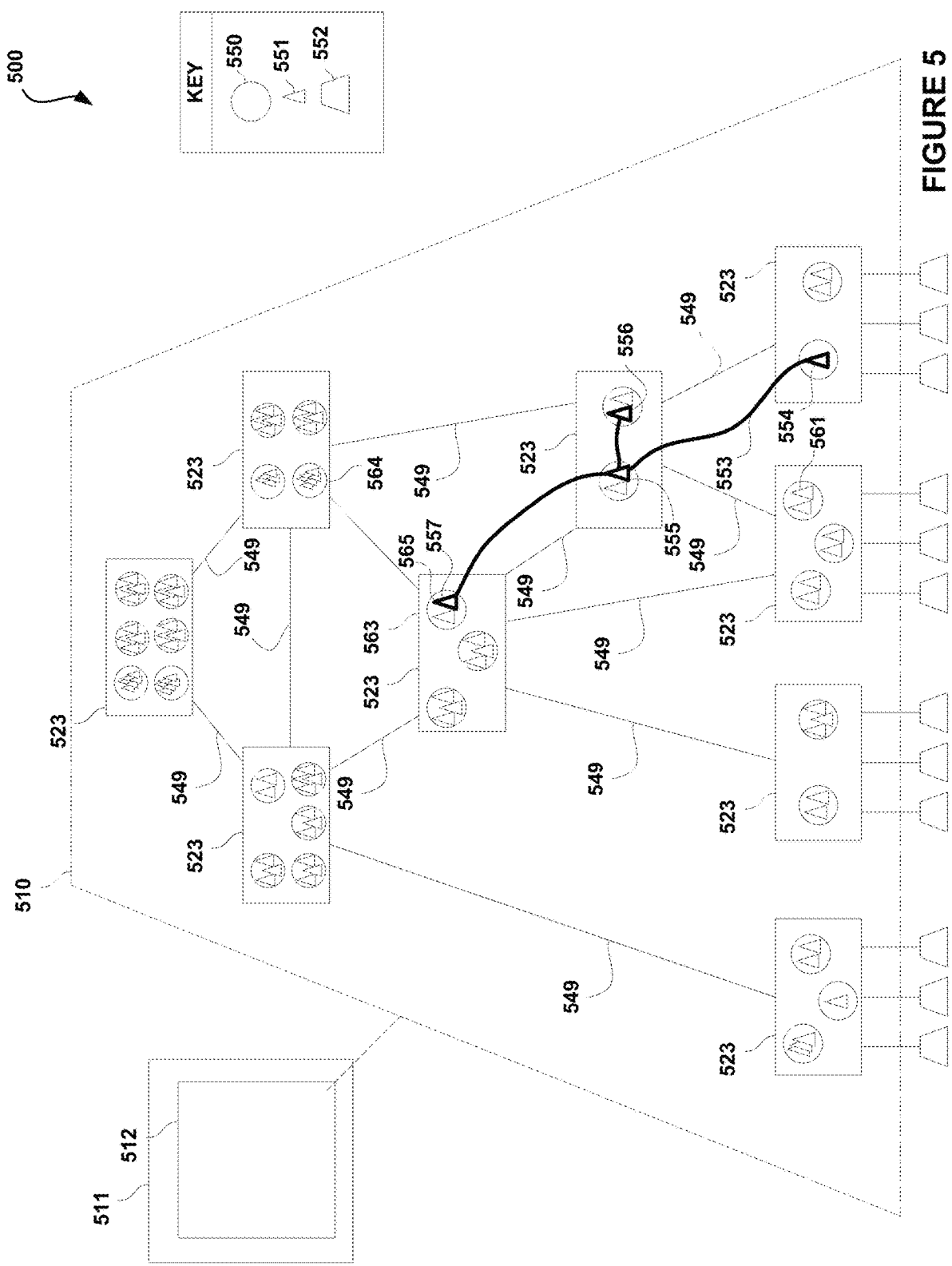
FIG. 5 illustrates a simplified diagram of a deployed NFV-based network, in accordance with one embodiment.

FIG. 5 illustrates a simplified diagram 500 of a deployed NFV-based network 510, in accordance with one embodiment. As an option, the diagram 500 may be viewed in the context of the details of the previous Figures. For example, in one embodiment, the deployed NFV-based network 510 and associated elements may represent the NFV-based networks and associated elements described in the context of the previous Figures. Of course, however, the diagram 500 may be viewed in the context of any desired environment. Further, the aforementioned definitions may equally apply to the description below.

As shown in FIG. 5, the NFV-based network 510 may include hardware units 523 connected via transmission lines 549, and VNFs implemented as software programs 550 installed in hardware units 523. Some of the hardware units 523 may be directly connected to a customer. The customer may be a subscriber, an end-user, or an organization, represented herein as a terminal or a server 552, or a plurality of terminals and/or servers 552. The NFV-based network 510 may also include a NFV management system 511 and an NFV-orchestration (NFV-O) 512 (which may all represent elements described in the context of the previous figures, etc.).

As shown further in FIG. 5, several, typically different, VNFs 550 may be installed in the same hardware unit 523. Additionally, the same VNF 550 may be installed in different hardware units 523.

A VNF 550 may be executed by a processor of the hardware unit 523 in the form of a VNF instance 551. Therefore, a particular VNF 550 installed in a particular hardware unit 523 may be "incarnated" in (e.g. initiated, executed as, etc.) any number of VNF instances 551. The VNF instances 551 may be independent of each other. Additionally, each VNF instance 551 may serve different terminals and/or servers 552. The NFV-based network 510 connects to and between communication terminal devices 552 that may be operated by one or more customers, subscribers, and/or end-users.

It is appreciated that a network operator may manage one or more services deployed in the customer's premises. Therefore, some of the hardware units 523 may reside within the premises of the network operator, while other hardware units 523 may reside in the customer's premises. Similarly, a server, such as server computer 216 of FIG. 2, may reside in the premises of the network operator or in the customer's premises. Consequently, when the network operator provides and/or manages one or more services for a customer's terminal devices 552 such as a server computer, the NFV-based network 510 of the network operator may directly manage the VNFs 550, providing the services and their VNF instances 551.

In such situation, the NFV-based network 510 may manage the services irrespectively of the location of the terminal devices 552 (e.g. the server computer 216, etc.), whether in the premises of the network operator or in the customer's premises. In other words, the NFV-based network 510 may be managing the VNFs 550 and the VNF instances 551 providing the services, as well as the terminal devices 552 (e.g. the server computer 216, etc.) being co-located within the same computing device (e.g. the hardware unit 523, etc.), whether in the premises of the network operator or in the customer's premises or in a commercial cloud or any other place.

A service provided by the communication network may be implemented using one or more VNFs. For example, the service may be a group, or a chain of interconnected VNFs. The VNFs making the group, or the service, may be installed and executed by a single processor, by several processors on the same rack, within several racks in the same data-center, or by processors distributed within two or more data-centers. In some cases, chain optimization may be employed by optimizing the deployment of a service in a communication network using network function virtualization, and to optimizing the deployment of a group, or a chain, of virtual network functions in the NFV-based network 510. Therefore, the term "chain optimization" refers to the planning and/or managing of the deployment of VNFs making a chain, or a group, of VNFs providing a particular service.

For example, FIG. 5 shows a first service 553, including the VNFs 550 and their respective VNF instances 554, 555, 556, and 557, and a thick line. In this example, the group or chain of the VNFs 550 making first service 553 are connected as a chain of VNFs 550. However, the VNFs 550 making a service may be connected in any conceivable form such as a star, tree-root, tree-branch, mesh, etc., including combinations thereof. It is noted that the VNFs 550 may be executed by two or more VNF instances 551, such as VNF 554.

The deployment of the group or chain of the VNFs 550 making the first service 553 is therefore limited by constraints such as the capacity of the communication link 549 bandwidth and/or latency (delay).

A VNF may have a list of requirements, or specifications, such as processing power, cash memory capacity, regular memory capacity (e.g. RAM, dynamic, or volatile memory, etc.), non-volatile memory (e.g. such as flash memory, etc.) capacity, storage capacity, power requirements, cooling requirements, etc. A particular VNF instance 551 providing a particular function (e.g. to a particular customer, entity, etc.) may have further requirements, or modified requirements, for example, associated with a particular quality of service (QoS) or service level agreement (SLA). Such requirements may include maximum latency or delay, average latency and maximum variance (latency jitter), maximal allowed packet loss, etc. Other requirements may include service availability, redundancy, backup, provisions for rollback and/or recovery, fault-tolerance, and/or fail-safe operation, etc.

A service made of a chain or a group of VNFs 550 and their VNF instances 551 may have a similar list of requirements, or specifications, covering the service as a whole. Therefore, such requirements, or specifications, may imply, affect, or include, requirements, or specifications, regarding communication links between the VNFs 550 and/or the VNF instances 551. Such requirements, or specifications, may include bandwidth, latency, bit-error rate, and/or packet loss, etc. Such communication requirements or specifications may further impose deployment limitations, or constraints, requiring particular VNFs 550 and/or VNF instances 551 to reside in the same data-center, or within the same rack, or even in the same computing device, for example, sharing memory or being executed by the same processor. Security measures may add further requirements, or specifications, such as co-location of some of the VNFs 550 and/or the VNF instances 551.

In the context of FIG. 5, the NFV-based network 510 has a hierarchical structure. There may be at least four aspects of the hierarchical structure of the NFV-based network 510. The networking or traffic aspect refers to the arrangement of the transmission lines between the hardware units 523. The processing aspect refers to the arrangement of the hardware units 523. The software aspect refers to the arrangement of the VNFs 550. The operational aspect refers to the arrangement of the VNF instances 551.

One aspect of the optimization process in an NFV-based network is that it may be based on real-time needs, rather than long-term, statistically anticipated, needs. One potential limitation on network reconfiguration in NFV-based networks is that network configuration does not result in a deterioration beyond acceptable level of any of the current services. The NFV deployment module (e.g. module 433 of FIG. 4, etc.) may function to enable and manage migration of services between the hardware units 523, the VNFs 550, and the VNF instances 551 in real-time, without affecting or with a minimal effect on the availability of a service, and while securing service and session continuity.

In the context of the current description, the term "continuous" means that the deployment optimization module and/or a chain optimization module (e.g. the chain optimization module 434 of FIG. 4, etc.) performs the relevant optimization task or process in run-time, or real-time, or online, or on-the-fly, or repetitively and without adversely affecting the network's functionality and its services.

Unlike a legacy network, the NFV-based network may have two topologies: the topology of the hardware devices, and the topology of the VNFs (the distribution of VNFs among the hardware devices). The topology of the hardware network is relatively stable, while the VNF topology can be optimized in real-time. Another benefit of the NFV-based network is that modifying the software topology (e.g. the distribution of VNFs among the hardware devices) is much less costly than any modification of the hardware topology. However, any modification of the network has its cost, including the cost of making such modification possible. Added cost may result from the need to process the modification of the topology and the re-distribution of VNF instances and to maintain excess resources for such purpose.

Thus, in some cases, it may be desired to localize the NFV-O 512, and particularly the deployment optimization processes associated with the deployment optimization module and the chain optimization module to reduce the cost, and simultaneously to secure the possibility to expand the scope of the network managed by these processes, if needed.

FIGS. 2 through 5 illustrate systems and environments to which certified VNFs may be deployed. Currently, service providers need to invest much time and effort in order to onboard new VNFs from a VNF vendor. Utilizing the online automated VNF certification system and tools described herein, service providers may perform compile level validation, deployment on data centers and testing, and performance/security testing in an efficient manner. In this way, the online automated VNF certification system may be implemented to perform industry wide VNF certification.

Service development is constrained by the speed of the Network Engineering create, test and debug cycle. Typically, this is a very manual, document-based and time-consuming process. The online automated VNF certification system addresses service development agility by offering highly automated design of new and updated services and virtual resources, as well as automatic readiness for rapid service launch. The online automated VNF certification system offers an online VNF on-boarding certification portal for vendors, based on best practices, by running VNF on-boarding tests. The online automated VNF certification system may be used by service providers to enforce certification as a pre-requisite to procurement.

Figure 6:
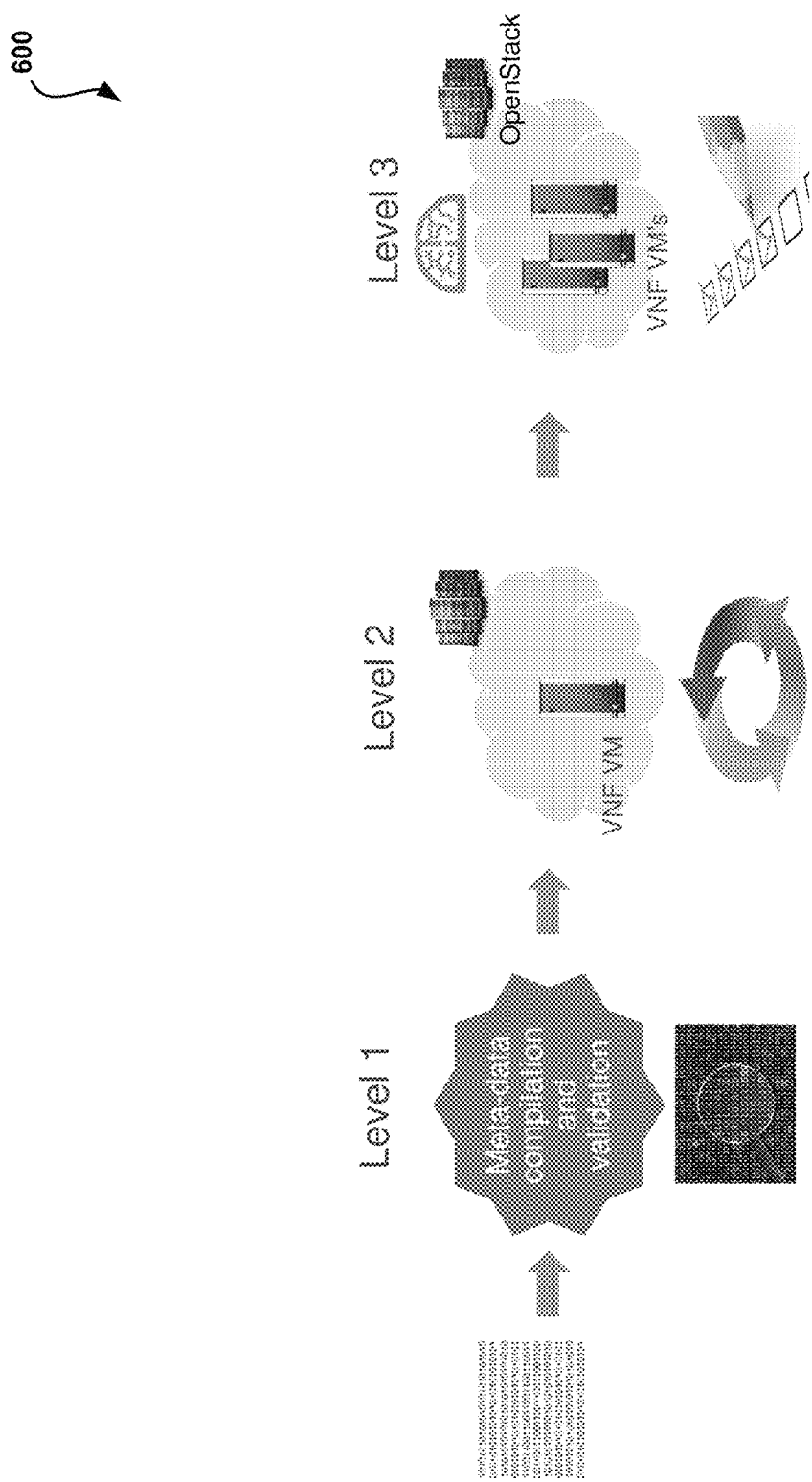
FIG. 6 illustrates a system flow diagram for automatically certifying a VNF for use in an NFV-based communication network, in accordance with one embodiment.

FIG. 6 illustrates a system flow diagram 600 for automatically certifying a VNF for use in an NFV-based communication network, in accordance with one embodiment. As an option, the system flow diagram 600 may be viewed in the context of the details of the previous figures. Of course, however, the system flow diagram 600 may be viewed in the context of any desired environment. Further, the aforementioned definitions may equally apply to the description below.

As shown, the online automated VNF certification system implements three levels of VNF on-boarding certification. The first level of certification includes a compile level validation of VNF package metadata. For example, the first level of certification may include testing the VNF documentation for an accurate TOSCA (Topology and Orchestration Specification for Cloud Applications) format.

The second level of certification includes a runtime validation focusing on basic deployment associated functionality associated with the VNF. The third level of certification includes a runtime validation including configuration validation, life cycle management and monitoring, functional certification, a basic performance indication, security checks, and/or service provider specific performance tests, etc.

The second and/or the third level certification may include executing test cases that may either come from vendors, ETSI testing documentation, a VNF guidelines document, and/or from test developers. The level two and three certification may also include testing based on a Network Cloud Service Orchestrator (NCSO), VNF functional certification, and/or vendor or service provider test cases.

With respect to the first level of certification and the manner in which VNFs are packaged, the online automated VNF certification system may expect and verify that the VNF information is packaged according to a defined standard (e.g. as defined by ETSI, etc.). This standard may specify how vendors are to deliver VNFs to service providers. This enables uniform packaging and may include information associated with installing and/or configuring a VNF.

A VNF package may include VM (virtual machine) images and/or other artifacts. The package may also specify VNF properties, resource requirements, and/or life-cycle methods, etc.

Generally, a standard VNF package is configured and deployed by a service provider and outputs of such deployed VNF packages may include, for example, HEAT templates, configuration drives, and/or images. The output may also be environment specific (e.g. VMWARE, etc.).

The VNF packaging life-cycle may include VNF package bundling for distribution, metadata testing (e.g. level one certification), pre-procurement, installation/validation/testing (e.g. level two certification), and software updates. The VNF package content may include, for example, license information, security information, software images, package metadata (e.g. ID, name, software version, etc.), and VNF metadata (e.g. a VNF model including information associated with connectivity, policy, affinity, deployment, and service life-cycle management, etc.).

Figure 7:
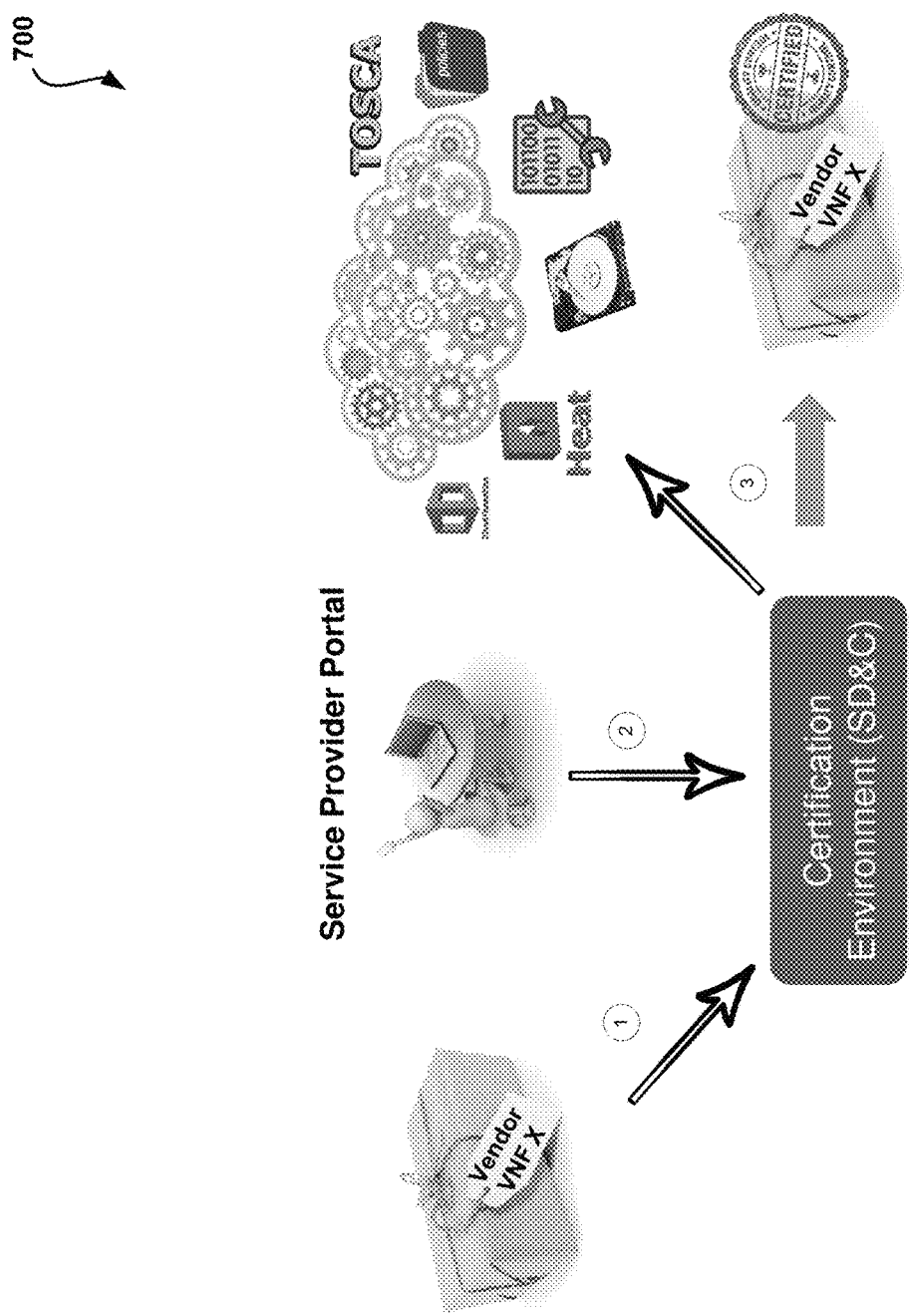
FIG. 7 illustrates a system flow diagram for automatically certifying a VNF for use in an NFV-based communication network, in accordance with one embodiment.

FIG. 7 illustrates a system flow diagram 700 for automatically certifying a VNF for use in an NFV-based communication network, in accordance with one embodiment. As an option, the system flow diagram 700 may be viewed in the context of the details of the previous figures. Of course, however, the system flow diagram 700 may be viewed in the context of any desired environment. Further, the aforementioned definitions may equally apply to the description below.

In operation, and in accordance with one embodiment, a VNF vendor may receive a "questionnaire" (e.g. according to a VNF packaging ETSI standard, etc.). The vendor may answer the questions and provide the required data to a service design and creation (SD&C) sub-system associated with an online automated VNF certification system. The vendor may provide information such as a VNF image and deployment scripts, a VNF descriptor, etc., as part of a VNF package (see step 1).

In one embodiment, a VNF designer may enter this data into the online automated VNF certification system utilizing an SD&C onboarding user interface, referred to as a service provider portal in FIG. 7 (see step 2). In another embodiment, the online automated VNF certification system may automatically parse and enter the received information. The online automated VNF certification system then automatically performs a level one certification by verifying a format and structure of the provided information, as well as VNF descriptor integrity. Other artifacts may also be validated and admitted as conforming to certain standards (e.g. an ETSI standard).

A VNF designer may then model the VNF utilizing the SD&C user interface. The designer may then instantiate the VNF. In one embodiment, the online automated VNF certification system may automatically configure and/or model the VNF and then instantiate the VNF. The SD&C may generate the artifacts associated with the VNF or use those provided by a VNF vendor as part of a VNF package.

The online automated VNF certification system then performs a level two certification on the VNF. This may include testing artifact production (e.g. HEAT, etc.), software image distribution, and/or policy configuration.

In one embodiment, level two certification may include validating communication with VNF VM(s), the artifacts production (e.g., HEAT, YANG, etc.), software image distribution, policy configuration, and communication with the VNF via YANG, etc.

The online automated VNF certification system then performs a level three certification of the VNF, which may include executing a plurality of test cases for testing the functionality of the VNF. This may include, for example, testing the end-to-end network service deployment, simulating the data traffic in order to enforce scale-in/out procedure, and testing VNF monitoring capabilities and policy decisions.

The output of the SD&C sub-system is a certified VNF that is ready for deployment into an NFV-based system. Thus, the online automated VNF certification system offers the ability to perform VNF certification and facilitates rapid deployment of new services.

Figure 8:
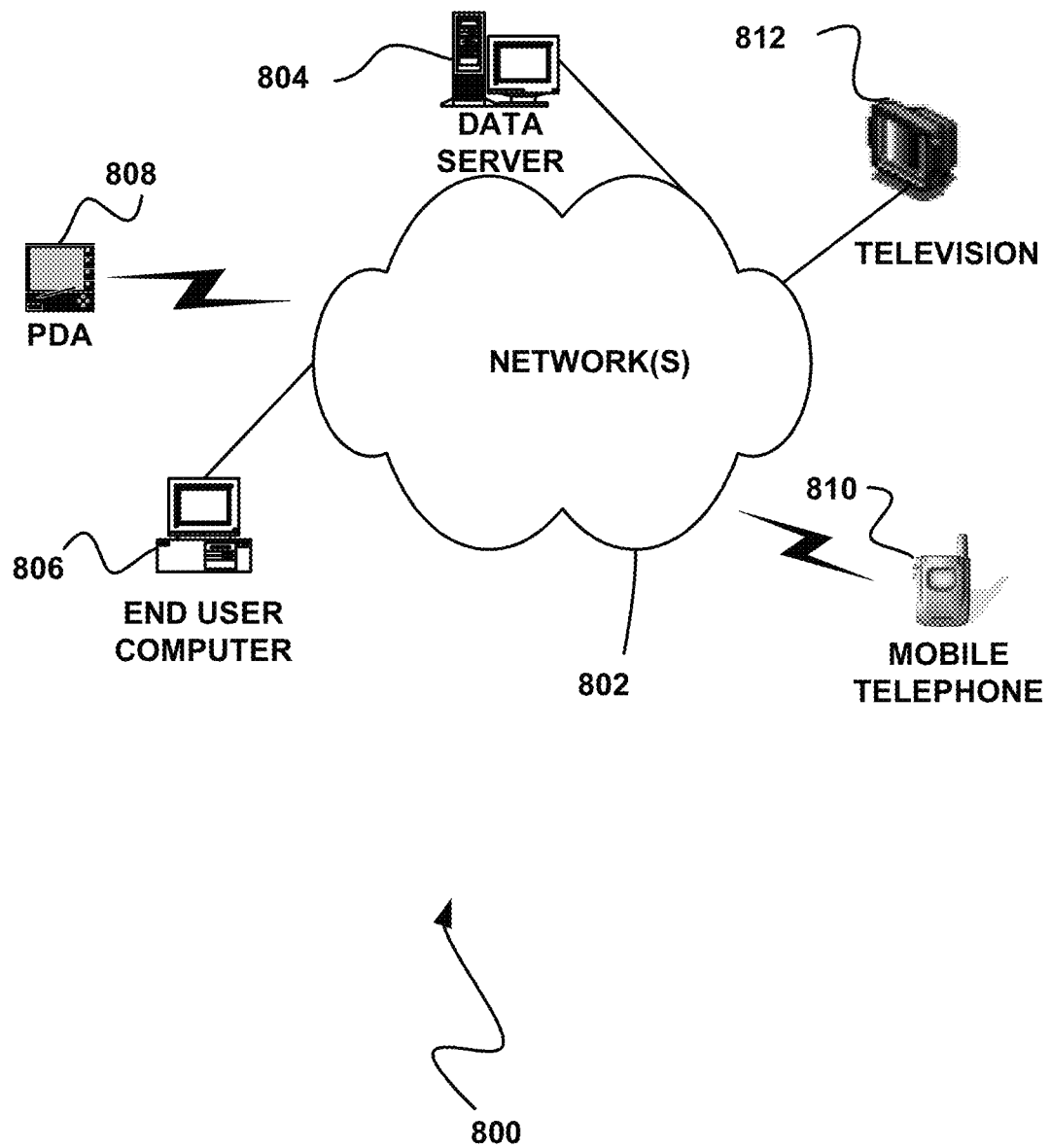
FIG. 8 illustrates a network architecture, in accordance with one possible embodiment.

FIG. 8 illustrates a network architecture 800, in accordance with one possible embodiment. As shown, at least one network 802 is provided. In the context of the present network architecture 800, the network 802 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 802 may be provided.

Coupled to the network 802 is a plurality of devices. For example, a server computer 804 and an end user computer 806 may be coupled to the network 802 for communication purposes. Such end user computer 806 may include a desktop computer, lap-top computer, and/or any other type of logic. Still yet, various other devices may be coupled to the network 802 including a personal digital assistant (PDA) device 808, a mobile phone device 810, a television 812, etc.

Figure 9:
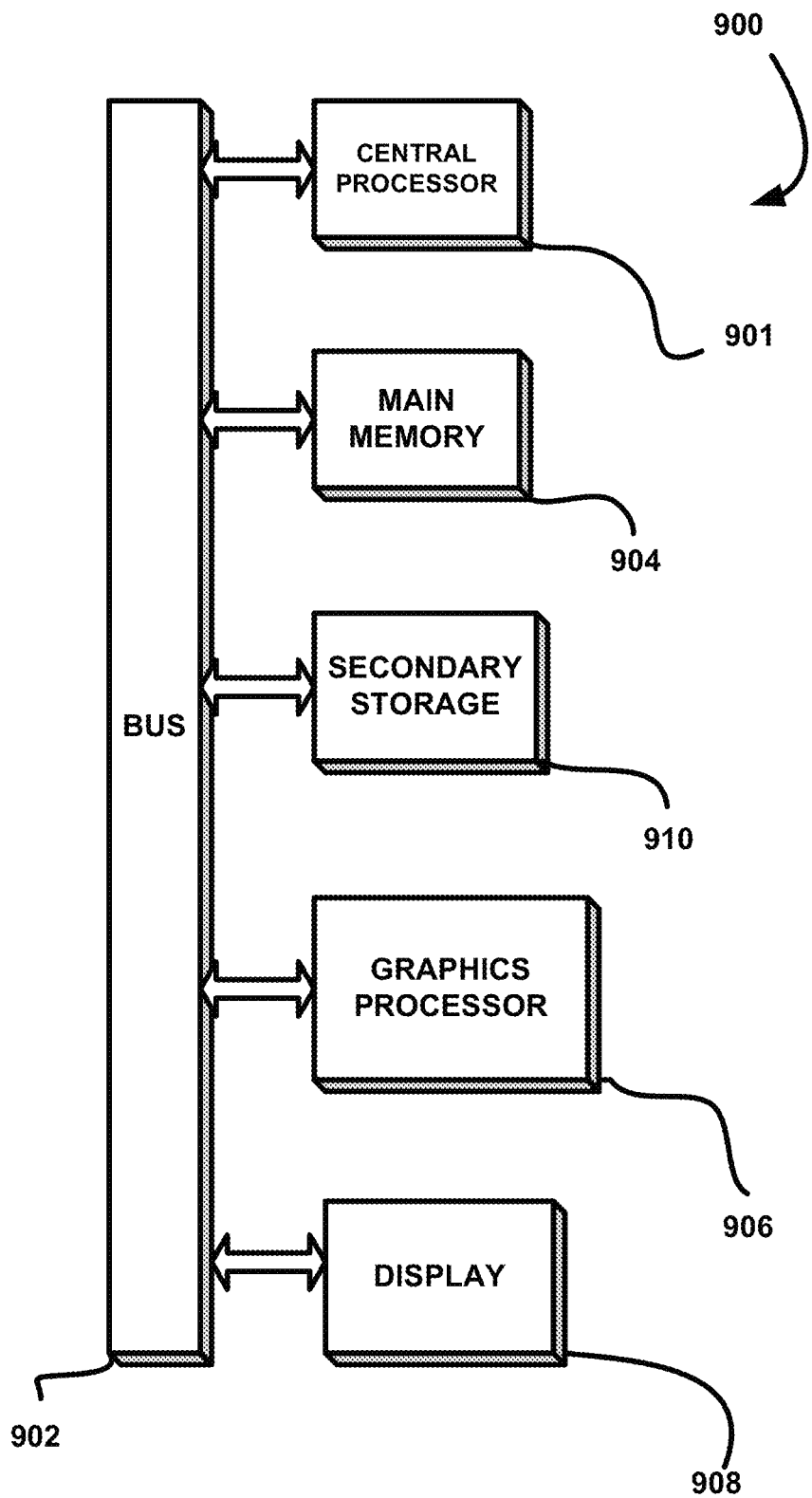
FIG. 9 illustrates an exemplary system, in accordance with one embodiment.

FIG. 9 illustrates an exemplary system 900, in accordance with one embodiment. As an option, the system 900 may be implemented in the context of any of the devices of the network architecture 800 of FIG. 8. Of course, the system 900 may be implemented in any desired environment.

As shown, a system 900 is provided including at least one central processor 901 which is connected to a communication bus 902. The system 900 also includes main memory 904 [e.g. random access memory (RAM), etc.]. The system 900 also includes a graphics processor 906 and a display 908.

The system 900 may also include a secondary storage 910. The secondary storage 910 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 904, the secondary storage 910, and/or any other memory, for that matter. Such computer programs, when executed, enable the system 900 to perform various functions (as set forth above, for example). Memory 904, storage 910 and/or any other storage are possible examples of tangible computer-readable media.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, by a virtual network function (VNF) certification system, information describing a virtual network function (VNF) capable of being implemented in a network function virtualization (NFV)-based network, the information usable to model the VNF;
   performing, by the VNF certification system, a first level of certification for the VNF including compile level validating of a format and structure of the information describing the VNF;
   responsive to the validation of the format and structure of the information describing the VNF in the first level of certification for the VNF, modeling, by the VNF certification system, the VNF to form an instantiated model of the VNF;
   performing, by the VNF certification system, a second level of certification for the VNF including validating deployment based functionality of the VNF using the instantiated model of the VNF, the deployment based functionality including artifact production associated with the VNF and software image distribution associated with the VNF;
   performing, by the VNF certification system, a third level of certification including validating the VNF based on one or more key performance indicators (KPIs); and
   responsive to performing the first, second, and third levels of certification, certifying, by the VNF certification system, the VNF to indicate that the VNF is authorized for use thereof in the NFV-based network.

2. The method of claim 1, wherein the one or more KPIs include one or more non-functional KPIs.

3. The method of claim 1, wherein the one or more KPIs are associated with micro-service design.

4. The method of claim 1, wherein the one or more KPIs are associated with VNF design.

5. The method of claim 1, wherein the one or more KPIs are independent of a specific network function virtualization infrastructure type.

6. The method of claim 1, wherein the one or more KPIs are associated with resiliency.

7. The method of claim 1, wherein the one or more KPIs are associated with granular scalability.

8. The method of claim 1, wherein the one or more KPIs are associated with license models.

9. The method of claim 1, wherein the one or more KPIs are associated with security features.

10. The method of claim 1, wherein the one or more KPIs are associated with associated with leveraging acceleration ability.

11. The method of claim 1, wherein:
    a first failure is reported when the first level of certification fails,
    a second failure is reported when the second level of certification fails, and
    a third failure is reported when the third level of certification fails.

12. The method of claim 1, wherein the third level of certification is performed by executing one or more test cases associated with the VNF and validating results of executing the one or more test cases, wherein the one or more test cases are configured for testing an end-to-end network service deployment, simulating data traffic in order to enforce scale-in and scale-out procedure, and testing VNF monitoring capabilities and policy decisions.

13. The method of claim 1, wherein the information describing the VNF is included in package metadata defined for the VNF, and wherein the first level of certification for the VNF includes compile level validating of a format and structure of the package metadata defined for the VNF.

14. The method of claim 13, wherein the first level of certification for the VNF includes verifying that the information is packaged according to a defined standard.

15. The method of claim 14, wherein the information includes virtual machine images, and wherein the information specifies properties of the VNF, resource requirements, and life-cycle methods.

16. The method of claim 1, wherein the second level of certification is a runtime validation for the VNF.

17. A computer program product embodied on a non-transitory computer readable medium, comprising computer code for:
    receiving, by a virtual network function (VNF) certification system, information describing a virtual network function (VNF) capable of being implemented in a network function virtualization (NFV)-based network, the information usable to model the VNF;
    performing, by the VNF certification system, a first level of certification for the VNF including compile level validating of a format and structure of the information describing the VNF;
    responsive to the validation of the format and structure of the information describing the VNF in the first level of certification for the VNF, modeling, by the VNF certification system, the VNF to form an instantiated model of the VNF;
    performing, by the VNF certification system, a second level of certification for the VNF including validating deployment based functionality of the VNF using the instantiated model of the VNF, the deployment based functionality including artifact production associated with the VNF and software image distribution associated with the VNF;
    performing, by the VNF certification system, a third level of certification including validating the VNF based on one or more key performance indicators (KPIs); and
    responsive to performing the first, second, and third levels of certification, certifying, by the VNF certification system, the VNF to indicate that the VNF is authorized for use thereof in the NFV-based network.

18. A virtual network function (VNF) certification system, comprising:
    a memory storing computer instructions; and
    a hardware processor that executes the computer instructions to perform a method comprising:
    receiving information describing a virtual network function (VNF) capable of being implemented in a network function virtualization (NFV)-based network, the information usable to model the VNF;
    performing a first level of certification for the VNF including compile level validating of a format and structure of the information describing the VNF;

responsive to the validation of the format and structure of the information describing the VNF in the first level of certification for the VNF, modeling the VNF to form an instantiated model of the VNF;

performing a second level of certification for the VNF including validating deployment based functionality of the VNF using the instantiated model of the VNF, the deployment based functionality including artifact production associated with the VNF and software image distribution associated with the VNF;

performing a third level of certification including validating the VNF based on one or more key performance indicators (KPIs); and responsive to performing the first, second, and third levels of certification, certifying the VNF to indicate that the VNF is authorized for use thereof in the NFV-based network.

* * * * *